United States Patent
Zuczek

(10) Patent No.: US 8,428,659 B1
(45) Date of Patent: Apr. 23, 2013

(54) INTELLIGENT RESONANT VIBRATION AMPLIFIER

(71) Applicant: Google Inc., Mountain View, CA (US)

(72) Inventor: Pawel Zuczek, Wroclaw (PL)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/628,925

(22) Filed: Sep. 27, 2012

Related U.S. Application Data

(60) Provisional application No. 61/700,560, filed on Sep. 13, 2012.

(51) Int. Cl.
*H04M 1/00* (2006.01)

(52) U.S. Cl.
USPC ..... 455/567; 455/566; 455/569.1; 455/569.2; 379/179; 379/180; 379/252; 379/374.03; 379/375.01

(58) Field of Classification Search .......... 455/566, 455/567, 569.1–569.2; 379/179–180, 252, 379/373.01–373.02, 374.03, 375.01, 376.01, 379/376.02
See application file for complete search history.

(56) References Cited

U.S. PATENT DOCUMENTS

| | | | |
|---|---|---|---|
| 6,373,958 B1 | 4/2002 | Enomoto et al. | |
| 6,774,769 B2 | 8/2004 | Okada | |
| 7,019,622 B2 | 3/2006 | Orr et al. | |
| 2002/0177471 A1 | 11/2002 | Kaaresoja et al. | |
| 2005/0208903 A1 | 9/2005 | Sakamoto | |
| 2006/0119573 A1 | 6/2006 | Grant et al. | |
| 2008/0089168 A1 | 4/2008 | Higuchi | |
| 2009/0243997 A1 | 10/2009 | Tierling et al. | |
| 2010/0024531 A1 | 2/2010 | Senoo | |
| 2010/0117471 A1 | 5/2010 | Huang | |
| 2010/0144395 A1 | 6/2010 | Komiya | |
| 2011/0003550 A1* | 1/2011 | Klinghult et al. | 455/41.3 |
| 2011/0053581 A1 | 3/2011 | Kao et al. | |
| 2012/0286973 A1* | 11/2012 | Czompo | 340/933 |

* cited by examiner

*Primary Examiner* — Wayne Cai
(74) *Attorney, Agent, or Firm* — Remarck Law Group PLC

(57) ABSTRACT

A computer-implemented method includes generating a first signal; generating vibrations in a mobile device based on the first signal; and sensing, using a microphone associated with the mobile device, sound generated by the vibrations. The method further includes generating an output based on the sound sensed by the microphone, measuring a level of the sound based on the output, and detecting a resonant frequency of the mobile device based on the level of the sound.

20 Claims, 3 Drawing Sheets

INTELLIGENT RESONANT VIBRATION AMPLIFIER

CROSS-REFERENCE TO RELATED APPLICATIONS

This application claims the benefit of U.S. Provisional Application No. 61/700,560, filed on Sep. 13, 2012. The entire disclosure of the above application is incorporated herein by reference.

FIELD

The present disclosure relates generally to mobile devices and more particularly to systems and methods for amplifying vibrations of a mobile device by detecting resonant frequency of the mobile device using a feedback loop.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Most mobile devices such as mobile phones include a vibrate mode in which the mobile device vibrates to indicate an incoming call or a text message. Often, however, users may not feel or hear vibrations generated by the mobile device when the mobile device is stored in a pocket or a bag (e.g., while walking). Consequently, users may not notice the indication provided by the mobile device when a call or a message is received.

SUMMARY

A computer-implemented method includes detecting an input received by a mobile device that requires providing an indication to a user of the mobile device by vibrating the mobile device. The method further includes detecting, in response to the mobile device receiving the input, whether the mobile device is in motion. The method further includes generating, in response to detecting that the mobile device is in motion, a first signal having a first frequency; outputting the first signal to a vibrating device capable of generating vibrations in the mobile device based on the first signal; and generating, using the vibrating device, vibrations based on the first signal having the first frequency. The method further includes sensing sound generated by the vibrations using a microphone associated with the mobile device, generating a second signal based on an output of the microphone, and measuring amplitude of the second signal. The method further includes varying the first frequency of the first signal and detecting a second frequency of the first signal at which the amplitude of the second signal is maximum. The method further includes generating the first signal having the second frequency; and generating, using the vibrating device, vibrations based on the first signal having the second frequency.

A computer-implemented method includes generating a first signal and generating vibrations in a mobile device based on the first signal. The method further includes sensing, using a microphone associated with the mobile device, sound generated by the vibrations; generating an output based on the sound sensed by the microphone; measuring a level of the sound based on the output; and detecting a resonant frequency of the mobile device based on the level of the sound.

A system includes a signal generator, a vibrating device, a microphone, and a control module. The signal generator generates a first signal. The vibrating device generates vibrations based on the first signal. The microphone senses sound generated by the vibrations and that generates an output. The control module selectively measures a level of the sound based on the output of the microphone and detects a resonant frequency of the system based on the level of the sound.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

The present disclosure relates to systems and methods for amplifying vibrations of a mobile device by detecting a resonant frequency of the mobile device using a feedback loop. A device typically vibrates with maximum intensity at a resonant frequency of the device. The resonant frequency of the device can be different when the device is held in hand than when the device is stored in a pocket or a bag, for example. Accordingly, the present disclosure relates to detecting the resonant frequency of the device when a user carrying the device in a pocket or a bag is moving, and vibrating the device at the detected resonant frequency, which can result in fewer unnoticed indications of incoming calls and messages for the user when the mobile device is stored in a pocket or a bag and when the user is moving.

A device can detect the resonant frequency in many ways. For example, a signal generator can generate an excitation signal to excite a vibrator in the device to produces vibrations in the device. A microphone can generate an audio signal representing sounds generated by the vibrations of the device. A control module can measure the amplitude (loudness) of the audio signal. The signal generator can vary the frequency of the excitation signal until the audio signal is loudest (i.e., until the amplitude of the audio signal is maximum). The frequency of the excitation signal at which the audio signal is loudest is the resonant frequency of the device. The signal generator can set the frequency of the excitation signal to the resonant frequency so that the device can vibrate with maximum intensity.

The mobile device can trigger the detection of the resonant frequency in many instances. For example, the mobile device can trigger the detection of the resonant frequency when the mobile device is stored in a pocket or a bag. The mobile device can also trigger the detection of resonant frequency when the mobile device detects motion using an accelerometer. For example, the mobile device can trigger the detection of the resonant frequency when the user carrying the mobile device in a pocket or a bag is walking. Vibrating the mobile device vibrates at the resonant frequency can result in fewer unnoticed indications of incoming calls and messages for the user when the mobile device is stored in a pocket or a bag and when the user is moving.

Figure 1:
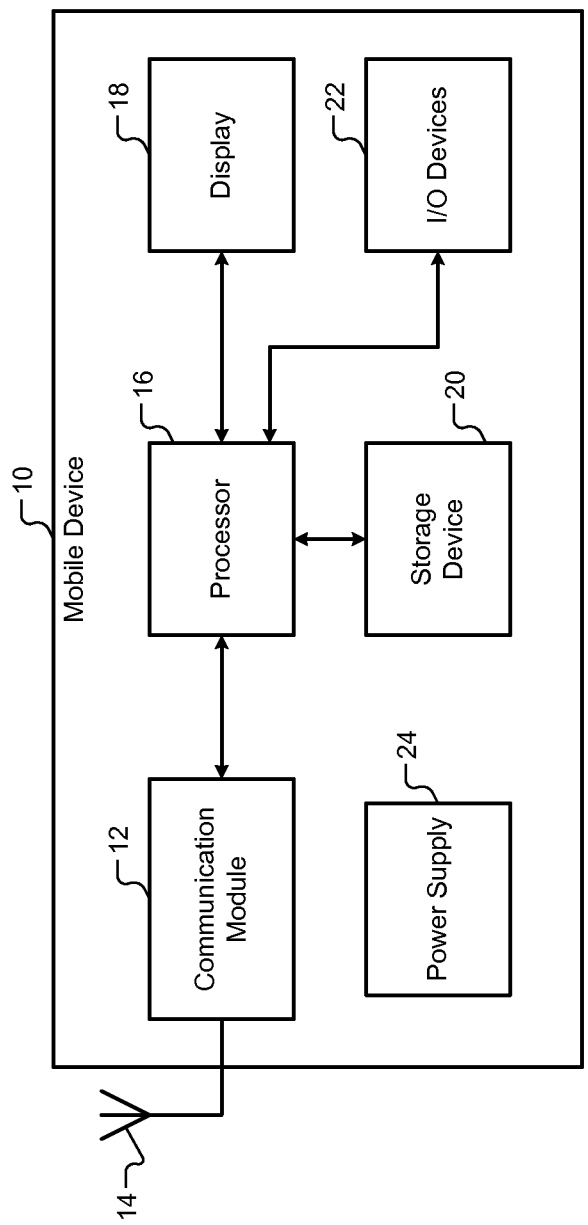
FIG. 1 depicts a functional block diagram of an example mobile device.

Referring now to FIG. 1, a functional block diagram of a mobile device 10 is shown. The mobile device 10 can include a cellular phone, a smartphone, or a tablet. The mobile device 10 includes a communication module 12 that can communicate with a cellular network and, optionally, with a wireless network such as a WiFi network via one or more antennas 14. The mobile device 10 further includes a processor 16, a display 18, a storage device 20, one or more input/output (I/O) devices 22, and a power supply 24.

The processor 16 processes data received by and transmitted from the mobile device 10 via the communication module 12. The data may include data related to phone calls and text messages originating from and received by the mobile device 10. The data may also include data downloaded by and uploaded from the mobile device 10.

The display 18 can output data processed by the processor 16. The display 18 can also include a touchscreen using which a user can input data. The I/O devices 22 can include devices such as a speaker, a microphone, and a camera. The storage device 20 can include memory such as flash memory to store data. The power supply 24 supplies power to the mobile device 10. The power supply 24 can receive power from an external source and can include a battery.

The user can set various features of the mobile device 10. For example, the user can set the mobile device 10 to generate audible sounds such as rings and beeps to indicate a variety of inputs received by the mobile device 10. For example, the inputs received by the mobile device may include a phone call, a text message, and a voice message. The user can also set the mobile device 10 to a vibrate mode in which the mobile device 10 vibrates to indicate an input received by the mobile device 10. Throughout the disclosure, inputs such as a phone call, a text message, and a voice message are used for example only. The mobile device 10 may also be set to vibrate to provide indications of alerts such as a calendar alert (e.g., a reminder for an event such as a conference call, or a meeting).

Users often set mobile devices to the vibrate mode and place the mobile devices in pockets or purses when moving around (e.g., while walking). As a result, users often cannot feel or hear the vibrations when a phone call, a text message, or a voice message is received. The vibrations, however, can be amplified if the mobile device is vibrated at a resonant frequency. The resonant frequency can be detected as described below when the mobile device is stored in a pocket or a purse and the user is moving.

Figure 2:
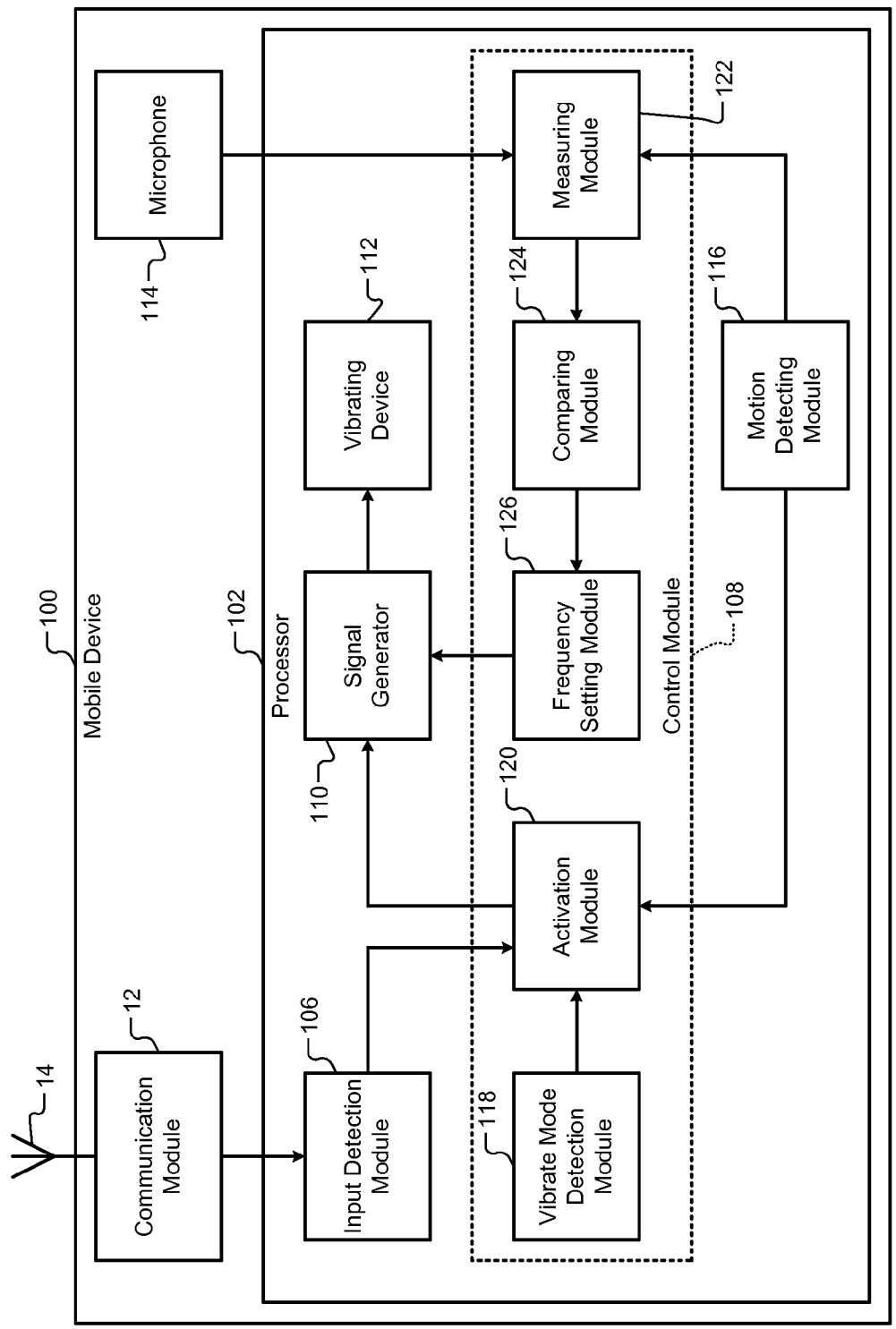
FIG. 2 depicts a functional block diagram of an example mobile device capable of vibrating at a resonant frequency according to some embodiments of the present disclosure.

Referring now to FIG. 2, a functional block diagram of a mobile device 100 capable of vibrating at a resonant frequency according to some embodiments of the present disclosure is shown. The mobile device 100 can include a cellular phone, a smartphone, or a tablet. The mobile device 100 can receive a variety of inputs such as a phone call, a text message, a voice message, or data being downloaded. The mobile device 100 can indicate receipt of an input in many ways. For example, the mobile device 100 can generate audible sounds such as a ring or a beep to indicate receipt of an input. The mobile device 100 can also operate in a vibrate mode in which the mobile device 100 vibrates to indicate receipt of an input.

The mobile device 100 includes the communication module 12 that can communicate with a cellular network and, optionally, with a wireless network such as a WiFi network via the one or more antennas 14. Although not shown for simplicity of illustration, the mobile device 100 also includes the display 18, the storage device 20, one or more input/output (I/O) devices 22, and the power supply 24, which are described with reference to FIG. 1. For example, the I/O devices 22 include a microphone 114. Additionally, the mobile device 100 includes a processor 102, which is described below in detail.

The processor 102 includes an input detection module 106, a control module 108, a signal generator 110, a vibrating device 112, and a motion detecting module 116. The input detection module 106 detects when the communication module 12 receives an input such as a phone call, a text message, or a voice message for which an indication is typically provided to the user. When the mobile device 100 is set to the vibrate mode, the signal generator 110 generates a signal and outputs the signal to the vibrating device 112. The vibrating device 112 can include a piezoelectric crystal that generates vibrations based on the signal. Alternatively, the vibrating device 112 can include a speaker that generates sounds of vibrations based on the signal. When the mobile device 100 receives an input that requires generating a vibration indication to the user, the vibrating device 112 generates vibrations based on the signal.

The motion detecting module 116 detects when the mobile device 100 is in motion. That is, the motion detecting module 116 detects when the user carrying the mobile device 100 is in motion. The motion detecting module 116 can include a variety of devices to detect the motion of the mobile device 100. For example, the motion detecting module 116 can include one or more of an accelerometer, a gyroscope, and a global positioning system (GPS) module to detect the motion of the mobile device 100.

The control module 108 includes a vibrate mode detection module 118, an activation module 120, a measuring module 122, a comparing module 124, and a frequency setting module 126. The vibrate mode detection module 118 detects when the mobile device 100 is set to the vibrate mode. The activation module 120 receives signals from the input detection module 106, the vibrate mode detection module 118, and the motion detecting module 116. The activation module 120 activates the signal generator 110 when the mobile device 100 (i) is set to the vibrate mode, (ii) is in motion, and (iii) receives an input that requires a vibration indication.

When activated, the signal generator 110 generates a signal having a frequency and outputs the signal to the vibrating device 112. The vibrating device 112 generates vibrations based on the signal. The microphone 114 senses the sound generated by the vibrations and generates an output. The measuring module 122 measures a level (e.g., amplitude or pitch) of the sound based on the output of the microphone 114. The comparing module 124 stores the level of the sound and, when the frequency is subsequently increased, compares the stored level to a new sound level measured based on vibrations generated by the signal at the increased frequency.

In some embodiments, the accelerometer and/or the gyroscope can also detect vibrations and generate outputs in response to the vibrations generated by the vibrating device 112. Accordingly, the measuring module 122 can measure the level (i.e., intensity) of vibrations based on outputs of at least one of the microphone 114, the accelerometer, and the gyroscope.

The frequency setting module 126 sets the frequency at which the signal generator 110 generates the signal. For example, the frequency setting module 126 increases the frequency of the signal generated by the signal generator 110. The vibrating device 112 generates new vibrations based on the increased frequency. The microphone 114 senses the sound of the new vibrations. The measuring module 122 measures the new level of the sound. The comparing module 124 compares the new level to the stored level. If the new level is greater than the stored level (i.e., if the level increases), the frequency setting module 126 increases the frequency further. The process continues until a frequency is found at which the level of the sound is maximum, which is the resonant frequency of the mobile device 100.

The resonant frequency (i.e., the frequency at which the vibration level is maximum) can be found in many ways. Two examples follow. In a first example, the frequency setting module 126 can continue to increase the frequency until a first frequency is found at which the vibration level, which continues to increase as the frequency is increased, decreases. The frequency value immediately preceding the first frequency is the resonant frequency. In a second example, the vibration level is measured for a full frequency spectrum, and the frequency at which the vibration level was found to be maximum is selected as the resonant frequency.

The frequency setting module 126 sets the frequency of the signal generated by the signal generator 110 to the resonant frequency. The signal generator 110 generates the signal having the resonant frequency. The vibrating device 112 generates vibrations at the resonant frequency. The mobile device 100 vibrates at the resonant frequency. The vibrations of the mobile device 100 at the resonant frequency are of maximum intensity. The likelihood that the user feels and/or hears the vibrations at the resonant frequency is maximum.

Figure 3:
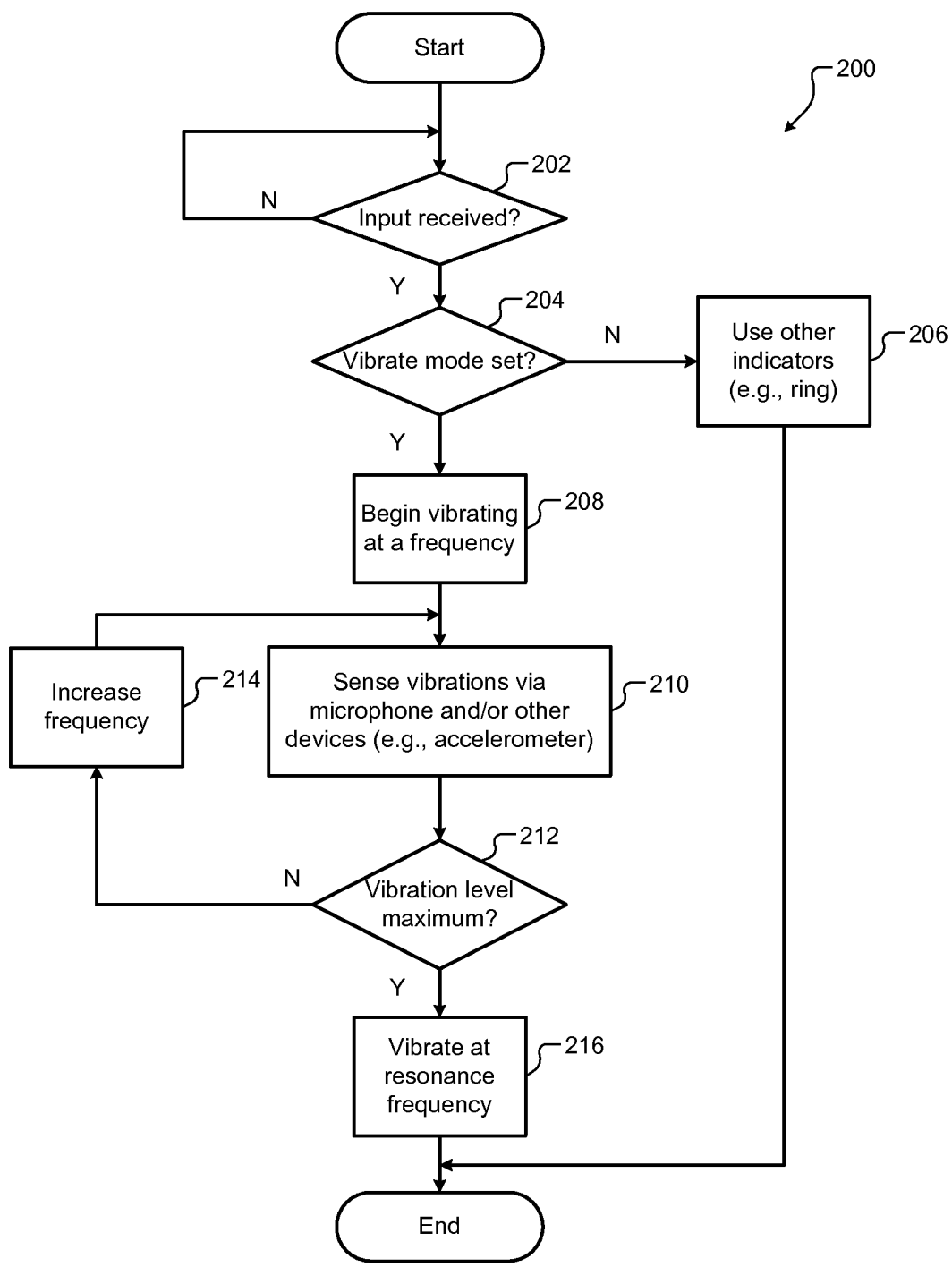
FIG. 3 depicts a flowchart of an example method for vibrating a mobile device at a resonant frequency according to some embodiments of the present disclosure.

Referring now to FIG. 3, a flowchart of a method 200 for vibrating a mobile device at a resonant frequency according to some embodiments of the present disclosure is shown. At 202, the input detection module 106 detects if the mobile device 100 received an input such as a phone call, a text message, or a voice message. Control waits until the mobile device 100 receives an input. At 204, if the mobile device 100 received an input, the vibrate mode detection module 118 detects if the mobile device is set to the vibrate mode. At 206, if the mobile device 100 is not set to the vibrate mode, control indicates receipt of the input using an indicator other than vibrations (e.g., using audible sounds such as a ring or a beep).

At 208, if the mobile device is set to the vibrate mode, the vibrating device 112 generates vibrations at a frequency of a signal generated by the signal generator 110. At 210, the microphone 114 (and/or other devices such as the accelerometer and the gyroscope) senses the vibrations. At 212, the comparing module 214 determines if the vibration level is maximum at a current frequency of the signal. At 214, if the vibration level is not maximum, the frequency setting module 126 increases the frequency of the signal generated by the signal generator 110, and control returns to 210. At 216, if the vibration level is maximum, the comparing module 124 determines that the frequency at which the vibration level is maximum is the resonant frequency of the mobile device 100. The frequency setting module 126 sets the frequency of the signal generated by the signal generator 110 to the resonant frequency, and the vibrating device 112 vibrates the mobile device 100 at the resonant frequency.

The teachings of the present disclosure are not limited to performing the resonant frequency detection only when the user carrying the mobile device is moving or only when the mobile device is stowed away in a pocket, a handbag, a drawer, a car, or on a tabletop, for example. The resonant frequency detection may be performed (i.e., triggered) if other conditions occur. For example, the resonant frequency detection may be performed if the mobile device begins to vibrate and the user does not respond in a predetermined time. For example, the predetermined time may be five seconds. Instead, other value of the predetermined time such as one second, two seconds, four seconds, seven seconds, and so on may be used. Alternatively, the resonant frequency detection may be performed if the mobile device begins to vibrate and the user does not respond after the mobile device has vibrated a predetermined number of times (e.g., three times, four times, five times, six times, and so on). In some embodiments, the resonant frequency detection may be performed if ambient noise level sensed by the microphone of the mobile device is greater than a predetermined threshold (e.g., in a noisy place such as a restaurant, a park, a train, and so on).

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known procedures, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The term "and/or" includes any and all combinations of one or more of the associated listed items. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

As used herein, the term module may refer to, be part of, or include: an Application Specific Integrated Circuit (ASIC); an electronic circuit; a combinational logic circuit; a field programmable gate array (FPGA); a processor or a distributed network of processors (shared, dedicated, or grouped) and storage in networked clusters or datacenters that executes code or a process; other suitable components that provide the described functionality; or a combination of some or all of the above, such as in a system-on-chip. The term module may also include memory (shared, dedicated, or grouped) that stores code executed by the one or more processors.

The term code, as used above, may include software, firmware, byte-code and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The techniques described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are non-volatile memory, magnetic storage, and optical storage.

Some portions of the above description present the techniques described herein in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the described techniques include process steps and instructions described herein in the form of an algorithm. It should be noted that the described process steps and instructions could be embodied in software, firmware or hardware, and when embodied in software, could be downloaded to reside on and be operated from different platforms used by real time network operating systems.

The present disclosure also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a tangible computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatuses to perform the required method steps. The required structure for a variety of these systems will be apparent to those of skill in the art, along with equivalent variations. In addition, the present disclosure is not described with reference to any particular programming language. It is appreciated that a variety of programming languages may be used to implement the teachings of the present disclosure as described herein, and any references to specific languages are provided for disclosure of enablement and best mode of the present invention.

The present disclosure is well suited to a wide variety of computer network systems over numerous topologies. Within this field, the configuration and management of large networks comprise storage devices and computers that are communicatively coupled to dissimilar computers and storage devices over a network, such as the Internet.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A computer-implemented method, comprising:
   detecting an input received by a mobile device, wherein the mobile device includes a vibrating device and a microphone, in response to which, the mobile device is to provide an indication to a user of the mobile device by vibrating the mobile device;
   determining whether the mobile device is in motion;
   generating, in response to determining that the mobile device is in motion, a first signal having a first frequency;
   outputting the first signal to the vibrating device capable of generating vibrations in the mobile device based on the first signal;
   generating, using the vibrating device, vibrations based on the first signal having the first frequency;
   sensing sound generated by the vibrations using the microphone associated with the mobile device;
   generating a second signal based on an output of the microphone;
   measuring amplitude of the second signal;
   varying the first frequency of the first signal;
   detecting a second frequency of the first signal at which the amplitude of the second signal is maximum;
   generating the first signal having the second frequency; and
   generating, using the vibrating device, vibrations based on the first signal having the second frequency.

2. A computer-implemented method, comprising:
   generating a first signal;
   generating vibrations in a mobile device based on the first signal;
   sensing, using a microphone associated with the mobile device, sound generated by the vibrations;

generating an output based on the sound sensed by the microphone;

measuring a level of the sound based on the output; and detecting a resonant frequency of the mobile device based on the level of the sound.

3. The computer-implemented method of claim 2, further comprising detecting the resonant frequency of the mobile device as a frequency of the first signal at which the level of the sound is maximum.

4. The computer-implemented method of claim 2, further comprising in response to detecting the resonant frequency:

generating the first signal having the resonant frequency; and generating vibrations based on the first signal having the resonant frequency.

5. The computer-implemented method of claim 2, further comprising varying the frequency of the first signal until the resonant frequency of the mobile device is detected.

6. The computer-implemented method of claim 2, further comprising:

detecting an input received by the mobile device, wherein the input requires providing an indication to a user of the mobile device by vibrating the mobile device;

detecting a motion of the mobile device; and detecting the resonant frequency in response to detecting the motion of the mobile device.

7. The computer-implemented method of claim 6, wherein the input received by the mobile device includes a telephone call, a text message, or a voice message.

8. The computer-implemented method of claim 6, further comprising detecting the motion of the mobile device based on outputs of at least one of an accelerometer, a gyroscope, and a global positioning system (GPS) module associated with the mobile device.

9. The computer-implemented method of claim 2, further comprising:

detecting the vibrations;

generating a second signal indicating a strength of the vibrations; and detecting the resonant frequency of the mobile device as a frequency of the first signal at which the level of the sound and the strength of the vibrations are maximum.

10. The computer-implemented method of claim 9, further comprising detecting the vibrations based on outputs of at least one of an accelerometer and a gyroscope associated with the mobile device.

11. A system, comprising:

a signal generator that generates a first signal;

a vibrating device that generates vibrations based on the first signal;

a microphone that senses sound generated by the vibrations and that generates an output; and a control module that selectively measures a level of the sound based on the output of the microphone and that detects a resonant frequency of the system based on the level of the sound.

12. The system of claim 11, wherein the control module detects the resonant frequency of the system as a frequency of the first signal at which the level of the sound is maximum.

13. The system of claim 11, wherein in response to detecting the resonant frequency:

the signal generator generates the first signal having the resonant frequency; and the vibrating device generates vibrations based on the first signal having the resonant frequency.

14. The system of claim 11, wherein the signal generator varies the frequency of the first signal until the control module detects the resonant frequency of the system.

15. The system of claim 11, further comprising:

a vibration detecting module that detects the vibrations and that generates a second signal indicating strength of the vibrations, wherein the control module detects the resonant frequency of the system as a frequency of the first signal at which the level of the sound and the strength of the vibrations are maximum.

16. The system of claim 15, wherein the vibration detecting module includes at least one of an accelerometer and a gyroscope associated with the system, and wherein the vibration detecting module detects the vibrations based on outputs of at least one of the accelerometer and the gyroscope.

17. A mobile device comprising:

a signal generator that generates a first signal;

a vibrating device that generates vibrations based on the first signal;

a microphone that senses sound generated by the vibrations and that generates an output;

a control module that selectively measures a level of the sound based on the output of the microphone and that detects a resonant frequency of the system based on the level of the sound;

an input detecting module that detects an input received by the mobile device, wherein the input requires providing an indication to a user of the mobile device by vibrating the mobile device; and a motion detecting module that detects a motion of the mobile device, wherein in response to the motion detecting module detecting the motion of the mobile device, the control module measures the level of the sound and detects the resonant frequency.

18. The mobile device of claim 17, wherein the input received by the mobile device includes a telephone call, a text message, or a voice message.

19. The mobile device of claim 17, wherein the motion detecting module includes at least one of an accelerometer, a gyroscope, and a global positioning system (GPS) module associated with the mobile device.

20. The mobile device of claim 19, wherein the motion detecting module detects the motion of the mobile device based on outputs of at least one of the accelerometer, the gyroscope, and the GPS module associated with the mobile device.

* * * * *